Patented July 2, 1940

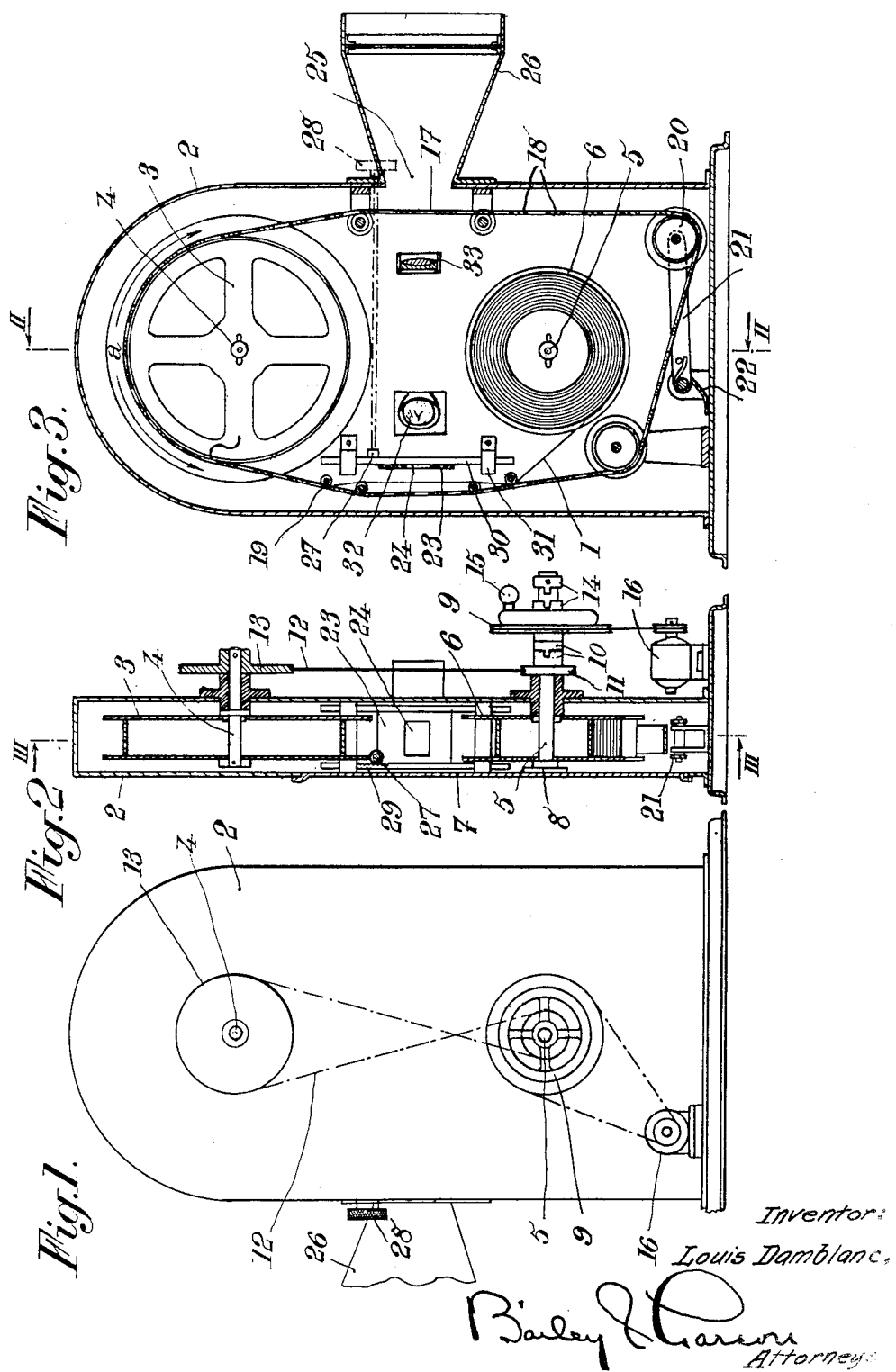

2,206,476

UNITED STATES PATENT OFFICE 2,206,476

APPARATUS FOR OBSERVING CINEMATOGRAPHIC BANDS

Louis Damblanc, Paris, France

Application July 16, 1937, Serial No. 154,092
In Belgium July 20, 1936

5 Claims. (Cl. 88—16)

The present invention relates to apparatus for observing cinematographic bands, and it is more especially, although not exclusively, concerned with apparatus of this kind for the examination of bands of the kind of those described in the Belgian Patent No. 412,666, filed by me on December 7, 1935, that is to say opaque bands, for instance of paper, on which the successive pictures are reproduced, in their chronological order, through usual printing methods, for instance heliogravure.

The object of the present invention is to provide an apparatus of the type above referred to which is better adapted to meet the requirements of practice than apparatus used for the same purpose at the present time.

The chief feature of the present invention consists in causing the band to be observed to drive the shutter device to be provided in apparatus of the kind in question, in such manner that the law of movement of said shutter device is, at any time, a function of the linear velocity of said band.

According to another feature of the present invention, the shutter device to be provided in apparatus of the kind with which the present invention is concerned consists of an endless band which is caused to move in such manner that, along at least a portion of its path, it moves parallelly and in the opposite direction with respect to the band to be observed, a plurality of suitably spaced transverse slots being provided in said endless band.

According to still another feature of the present invention, whereas the apparatus is arranged in such manner that the images to be observed move with a continuous motion and are seen through a shutter device moving also with a continuous motion but in the opposite direction, I provide, between said shutter device and the band on which the images to be observed are reproduced, a diaphragm or equivalent element of a size such that the field visible on said band is equal to the area of one of said images, adjusting means being advantageously provided for permitting the person who is utilizing the apparatus to displace said diaphragm in the direction in which said band is unwinding.

Other features of the present invention will result from the following detailed description of a specific embodiment thereof.

A preferred embodiment of the present invention will be hereinafter described, with reference to the accompanying drawing, given merely by way of example, and in which Fig. 1 is a side elevational view of an apparatus for observing a band on which a succession of images are reproduced in their chronological order, the apparatus shown by this figure being made according to the invention;

Fig. 2 is a vertical section on the line II—II of Fig. 3;

Fig. 3 is a vertical section on the line III—III of Fig. 2.

The invention concerns an apparatus permitting to observe a succession of images or pictures printed in their chronological order on an opaque band I, for instance of paper, in such manner that the person observing said band has the impression of a movement similar to that obtained by the projection of a cinematographic film.

Up to the present time, bands of this kind were observed by means of apparatus called praxynoscopes, which consisted essentially of a kind of cylindrical box in the lateral walls of which are provided vertical slots. The band was applied against the base of the internal lateral walls of said box, and the latter was caused to turn about its center. By placing the eye on the outside of the box, at the level of the upper part of said slots, it was possible to observe the pictures moving together with the diametrally opposed portion of said box, and this observation of the images through the slots gave the impression of a continuous movement.

This apparatus had several drawbacks, the chief disadvantages being the two following ones:

a. the observer was allowed to see simultaneously several images;

b. furthermore, it was possible to observe only very short bands with an apparatus of average size.

According to the present invention, the first of these drawbacks is obviated by providing, between the shutter device to be included in such an apparatus and the band I on which are reproduced the pictures to be observed, a diaphragm of any suitable type, of a size such that the field of the observer on said band is substantially equal to the area of one of said pictures, means being advantageously provided for permitting the observer to displace said diaphragm in the direction of unwinding of said band.

For this purpose, concerning first the mechanism to be provided for ensuring the continuous unwinding of band I, said mechanism may be made in any usual suitable manner. Advantageously, this device is made in such manner that it can comply to the following conditions:

On the one hand it must permit of unwinding a relatively important length of a band previously wound on a spool or the like, which permits of obviating the second of the drawbacks above mentioned;

On the other hand, it must permit of again winding said band on said spool, once the band has been observed.

Such a device may, for instance, be given the shape visible in the drawing, and in which there is mounted inside a casing 2:

a. a receiving spool 3 of the kind of those employed for winding cinematographic films, said spool being keyed on a spindle 4 mounted horizontally between the lateral walls of said casing 2;

b. a spindle or shaft 5, the end of which is free, capable of supporting and rotating a spool 6 on which band 1 is preliminarily mounted.

Furthermore, a door 7 is provided in one of the lateral walls of the casing 2 so as to permit of engaging said spool 6 on said spindle or shaft 5, the latter being preferably supported, at its free end, by a bearing 8 rigid with the inner wall of said door 7.

I provide a control system, which may consist, for instance, of a hand-wheel 9, which is slidably mounted on the external prolonged end of shaft 5, being free to rotate on said shaft. According to the position it occupies, wheel 9 is capable of exerting either of the two following actions:

Either, through intermeshing teeth 10 (position shown by Fig. 2 of the drawing) it drives a pulley 11, also mounted loose on said shaft 5, said pulley 11 itself driving the receiving spool 3 through a flexible crossed connection 12 (belt) and a pulley 13 keyed on the prolonged part of shaft 4;

Or, through teeth 14, said wheel 14 drives shaft 5 and consequently spool 6, the latter then turning in a direction opposed to that of spool 3, for the same direction of rotation of wheel 9, as a consequence of the fact that belt 12 is crossed, which permits of again winding the film on spool 6 after said film has been examined.

It is also possible, when band 1 is printed on both of its faces, to wind said band, after having observed one side, on spool 6 in such manner that it is possible to observe the other side. It suffices, for this purpose, to bring wheel 9 into the right hand position, to cause it to turn in the anti-clockwise direction and then to turn said spool 6 from end to end.

Of course, wheel 9 may be driven either manually, in which case there is provided an operating finger 15, preferably located close to the right hand of the observer, or by means of a motor such for instance as an electric motor 16.

I will now consider the shutter device above mentioned.

Preferably, according to another feature of the present invention, this shutter device includes an endless band 17, for instance of paper reinforced by cloth, which is given, in at least some of its parts, a movement parallel to band 1 and in the opposite direction. This band 17 is provided with a multiplicity of transverse slots 18, preferably located at a distance from one another corresponding to the width of a picture.

Advantageously, according to still another feature of the present invention, this endless band is arranged to be driven by band 1, in such manner that the linear velocity of band 17 is equal, at any time, to that of band 1, which is driven at a variable speed, for a given uniform speed of wheel 9, due to the fact that the winding radius on spool 3 increases as said band 1 is being wound on said spool 3.

Although it is possible, within the scope of the invention, to have the shutter band 17 driven by band 1 in an indirect manner, it is believed to be more advantageous to arrange things in such manner that the drive is obtained by a direct contact between these two bands. Such an embodiment is illustrated in the drawing, being made as follows:

The shutter band 17 is arranged to bear directly upon band 1 along an arc $a$ of spool 3, this arc being chosen of a length sufficient for ensuring the drive of band 17 by band 1;

Guiding rollers 19 are provided for compelling said band 17 to move, at least along certain portions of its path, parallelly to band 1.

I further provide means for tensioning said band 17, said tensioning system consisting, for instance, of a roller 20 carried by the end of an arm 21 subjected to the action of a spring 22.

I will now describe the structure and mounting of the diaphragm to be provided for preventing the observer from seeing more than one picture at a time.

Such a diaphragm device consists advantageously of a screen 23 in which there is provided a rectangular hole 24 substantially of the same size as the pictures to be observed. This screen is arranged close to the front face of band 1, in such manner that it is located, on the one hand, in front of a portion of said band where the latter is substantially parallel to band 17, and, on the other hand, in the field of an observation window 25 which is provided, for this purpose, in a wall of casing 2, said window being advantageously provided with a kind of funnel 26.

In order to constitute the adjusting means adapted to permit of displacing said screen 23 in the direction of unwinding of band 1, I provide a control system of a usual type, including, for instance a pinion 27 adapted to rotate together with a control knob 28, located close to the observer's hand, said pinion 27 being adapted to coact with a rack 29 which is mounted for this purpose on the side of screen 23, the latter being then maintained by guides 30 slidable in slideways or the like 31.

Finally, the whole system is completed by the adjunction of the following elements:

An internal illuminating system consists, for instance, of an electric lamp 32 which is disposed ahead of band 1 and slightly on the side of said band, in such manner that it is not in the visual field of the observer.

Furthermore, advantageously, there is provided an optical device such as an eye-piece 33, capable of magnifying the pictures reproduced on said band, this eye piece being adapted to coact with a semi-cylindrical lens or including such a lens.

I may also, in order to improve the conditions of observation, arrange the whole apparatus in such manner that most of the mechanical parts located in casing 2, same as the inner walls of the latter, are painted black in such manner as to absorb the rays that strike them instead of reflecting them toward window 25, which would impair the clearness of the pictures.

Whatever be the specific embodiment that is chosen, the system above described constitutes an apparatus for the observation of an opaque band on which pictures are reproduced in a chronological order, the working of this apparatus resulting sufficiently clearly from the above description for rendering unnecessary any complementary explanation.

Such an apparatus has many advantages, and, in particular, that of permitting of observing very clearly the images reproduced on band 1, the impression of movement that is produced being comparable with that obtained by projection with much more complicated cinematographic apparatus.

Another advantage of this apparatus is that its operation is simple, its working reliable, and its cost relatively low.

Finally, it permits several persons placed in front of the observation window simultaneously to observe the unwinding of band 1.

Of course, instead of observing directly the pictures reproduced on band 1, it would be possible to observe their projection by reflexion by means of an optical system on frosted glass or any other suitable screen which would be disposed substantially in the frame of the observation window, which would enable a greater number of persons simultaneously to observe the images.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus for the observation of a paper film, which comprises, in combination, a casing with an observation window, a spool adapted to carry said film journalled in said casing, another spool for the winding of said film thereon, means for driving the last mentioned spool, an endless band provided with transverse slots forming a shutter device interposed between said observation window and said film, and means to guide an endless band in contact with a portion of the periphery of the roll of film on the second mentioned spool so as to be driven by said roll, whereby said band moves at the same linear speed as said film.

2. An apparatus for the observation of a paper film which comprises, in combination, a casing with an observation window, means for moving said film in front of said window, an endless band provided with transverse slots, forming a shutter device interposed between said observation window and said film, means to guide said band so that at least a portion thereof moves parallelly to the corresponding portion of the film and in the inverse direction, and frictional means interconnecting said film and said endless band driving said endless band at a speed having a constant proportion to the speed of the film.

3. An apparatus for the observation of a paper film which comprises, in combination, a casing with an observation window, a spool adapted to carry said film journalled in said casing, another spool for the winding thereon of the film from the first mentioned spool, means for driving the last mentioned spool, an endless band provided with transverse slots forming a shutter device interposed between said observation window and said film, means for guiding said endless band so that at least a portion thereof extends parallel to the corresponding portion of the said film and moves in the opposite direction, and means to guide said endless band in contact with a portion of the periphery of the roll of film on said second mentioned spool so as to be driven by said roll, whereby said band moves at the same linear speed as said film.

4. An apparatus for the observation of a paper film, which comprises, in combination, a frame with an observation window, means for moving said film in front of said window in a continuous manner, a shutter device interposed between said window and said film, frictional means interconnecting said film and said shutter device for moving said shutter device also in a continuous manner but in a direction opposed to that of said film, and a diaphragm of a size corresponding to that of the field of observation on said film interposed between said shutter device and said film.

5. An apparatus for the observation of a paper film which comprises, in combination, a frame with an observation window, means for moving said film in front of said window in a continuous manner, a shutter device interposed between said window and said film, frictional means interconnecting said means and said shutter device for moving said shutter device also in a continuous manner but in a direction opposed to that of said film, a diaphragm of a size corresponding to that of the field of observation on said film interposed between said shutter device and said film, and means for adjusting said diaphragm by displacing it in the direction of movement of said film.

LOUIS DAMBLANC.